United States Patent
Huang

(10) Patent No.: US 7,178,765 B2
(45) Date of Patent: Feb. 20, 2007

(54) COMPUTER SUPPORTER

(76) Inventor: Min-Hua Huang, 235 Chung-Ho Box 8-21, Taipei (TW)

( * ) Notice: Subject to any disclaimer, the term of this patent is extended or adjusted under 35 U.S.C. 154(b) by 153 days.

(21) Appl. No.: 10/942,327

(22) Filed: Sep. 16, 2004

(65) Prior Publication Data

US 2006/0054752 A1    Mar. 16, 2006

(51) Int. Cl.
*A47F 5/00* (2006.01)

(52) U.S. Cl. .............. 248/122.1; 248/233.41; 248/125.1; 52/36.6

(58) Field of Classification Search ........... 248/125.1, 248/122.1, 125.3, 218.4, 219.1, 219.3, 219.4, 248/223.41, 224.51, 224.61, 188.1, 227.3; 108/152; 211/107; 403/117, 381, 331; 52/36.6, 52/239, 761, 781

See application file for complete search history.

(56) References Cited

U.S. PATENT DOCUMENTS

| | | | | |
|---|---|---|---|---|
| 3,462,110 A | * | 8/1969 | Cheslock | 248/219.4 |
| 4,021,973 A | * | 5/1977 | Hegg et al. | 52/36.6 |
| 4,163,537 A | * | 8/1979 | Mourgue | 248/188.1 |
| 4,458,455 A | * | 7/1984 | Tollstoff de Voss | 52/38 |
| 4,805,365 A | * | 2/1989 | Bastian | 52/282.2 |
| 4,936,068 A | * | 6/1990 | VictorSchonfeld et al. | 52/282.2 |
| 4,941,763 A | * | 7/1990 | Euteneuer | 403/3 |
| D330,774 S | * | 11/1992 | Klaric | D25/125 |
| 5,175,971 A | * | 1/1993 | McCombs | 52/736.2 |
| 5,647,650 A | * | 7/1997 | Daugherty et al. | 312/265.1 |
| 5,791,806 A | * | 8/1998 | Giehl | 403/117 |
| 6,161,262 A | * | 12/2000 | Pfister | 24/514 |
| 6,397,537 B2 | * | 6/2002 | Auer et al. | 52/282.2 |
| 6,550,731 B1 | * | 4/2003 | Kim | 248/223.41 |
| 6,554,235 B1 | * | 4/2003 | Fortier | 248/122.1 |
| 6,682,255 B2 | * | 1/2004 | Battaglia et al. | 403/381 |
| 2006/0150572 A1 | * | 7/2006 | Rawson-Harris | 52/736.2 |

FOREIGN PATENT DOCUMENTS

WO    WO 2004038134 A1  *  5/2004

* cited by examiner

*Primary Examiner*—Anita M. King

(57) ABSTRACT

A computer supporter comprises a stand post. A surface of the stand post has a plurality of T shape protrusions axially arranged along the stand post. Each two T shape protrusions are formed with a sliding recess. A sliding block has a surface being installed with a plurality of sliding tracks. Each sliding track has an Ω shape cross section; each sliding track passing through a respective one of the sliding recess. The sliding track is slidable along the sliding recess. A clamping seat is formed at one end of the supporting frame. The clamping seat is capable of being adhered to the surface of the stand post. The supporting frame has a groove for receiving the sliding block. Studs pass through the holes of the supporting frame and the screw holes of the sliding block so as to fix the supporting frame to the screw holes.

1 Claim, 4 Drawing Sheets

COMPUTER SUPPORTER

FIELD OF THE INVENTION

The present invention relates to supporting frames, and particular to a computer supporter, wherein it is only necessary that a supporting frame is supported to a stand post through a sliding block. The sliding block is slidable on one of the recesses in the stand post. Thereby, the stand post has a plurality of T shape protrusions which form a plurality of recesses so that the sliding block can be installed to a desired recess.

BACKGROUND OF THE INVENTION

With reference to FIG. 1, a rolling cart for a computer and a flat panel display includes a base 12 with plural castered dual wheels 11, a mounting pole 10 projecting upward from the base 12, at least one pole mounting bracket 20, a pivot support bracket supported by the pole mounting bracket 20 and securing a support arm which is suitable for supporting a flat panel display. Another pole mounting bracket supports another pivot support bracket and secures a second support arm having a pivot/brake assembly suitable for supporting a keyboard. Additionally, the cart supports a CPU bracket and a UPS mounting bracket. The pivot/brake assembly includes a frictional assembly and a brake assembly. However, in the prior art the pole 10 is welded or screwed to the bracket 20. Thereby, it is unadjustable so that the operation is inconvenient.

SUMMARY OF THE INVENTION

Accordingly, the primary object of the present invention is to provide a computer supporter, wherein it is only necessary that a supporting frame is supported to a stand post through a sliding block. The sliding block is slidable on one of the recesses in the stand post. Thereby, the stand post has a plurality of T shape protrusions which form a plurality of recesses so that the sliding block can be installed to a desired recess.

To achieve above objects, the present invention provides a computer supporter which comprises a stand post. A surface of the stand post has a plurality of T shape protrusions axially arranged along the stand post. Each two T shape protrusions are formed with a sliding recess. A sliding block has a surface being installed with a plurality of sliding tracks. Each sliding track has an $\Omega$ shape cross section; each sliding track passing through a respective one of the sliding recess. The sliding track is slidable along the sliding recess. A clamping seat is formed at one end of the supporting frame. The clamping seat is capable of being adhered to the surface of the stand post. The supporting frame has a groove for receiving the sliding block. Studs pass through the holes of the supporting frame and the screw holes of the sliding block so as to fix the supporting frame to the screw holes.

The various objects and advantages of the present invention will be more readily understood from the following detailed description when read in conjunction with the appended drawing.

DETAILED DESCRIPTION OF THE INVENTION

In order that those skilled in the art can further understand the present invention, a description will be described in the following in details. However, these descriptions and the appended drawings are only used to cause those skilled in the art to understand the objects, features, and characteristics of the present invention, but not to be used to confine the scope and spirit of the present invention defined in the appended claims.

Figure 1:
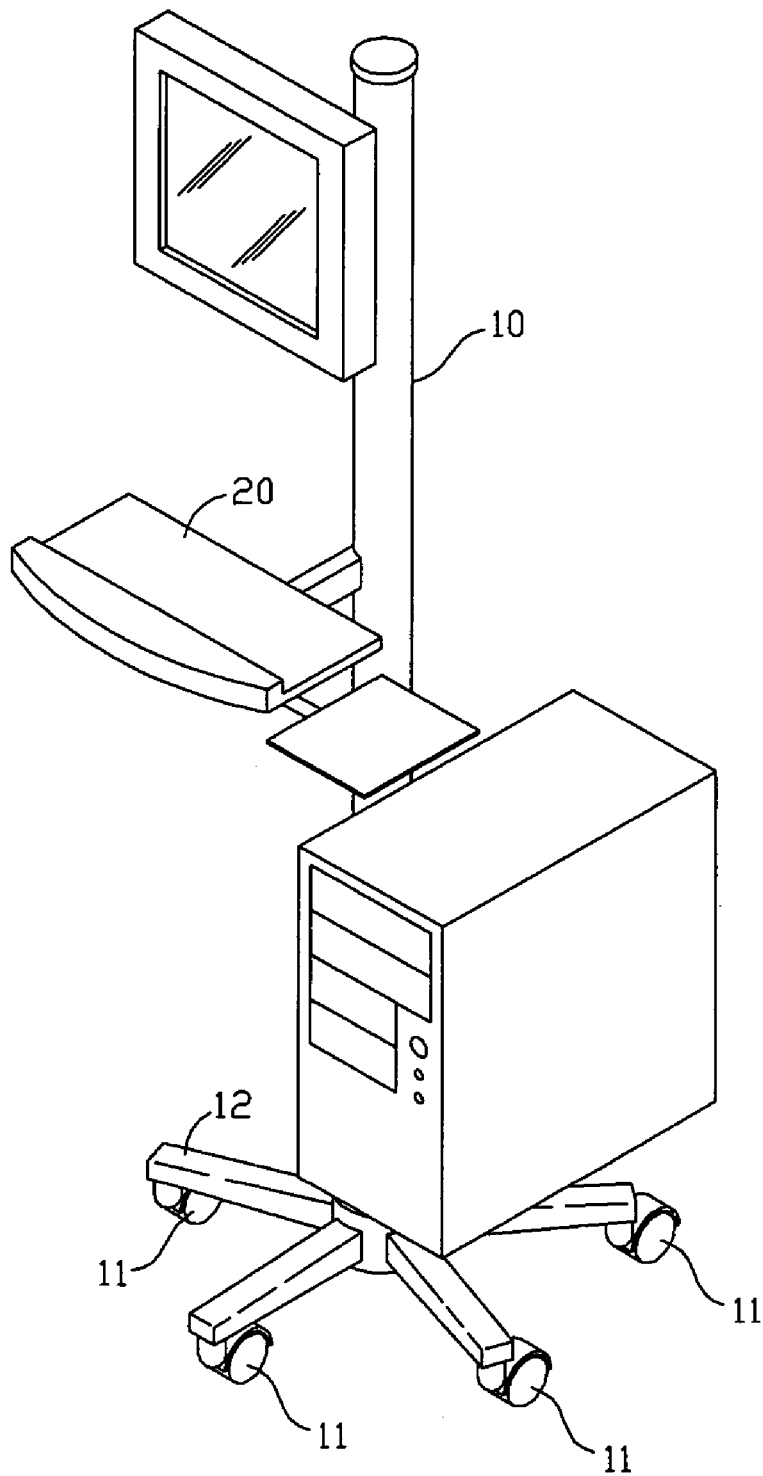
FIG. 1 is a perspective view of a prior art computer supporter.
Figure 2:
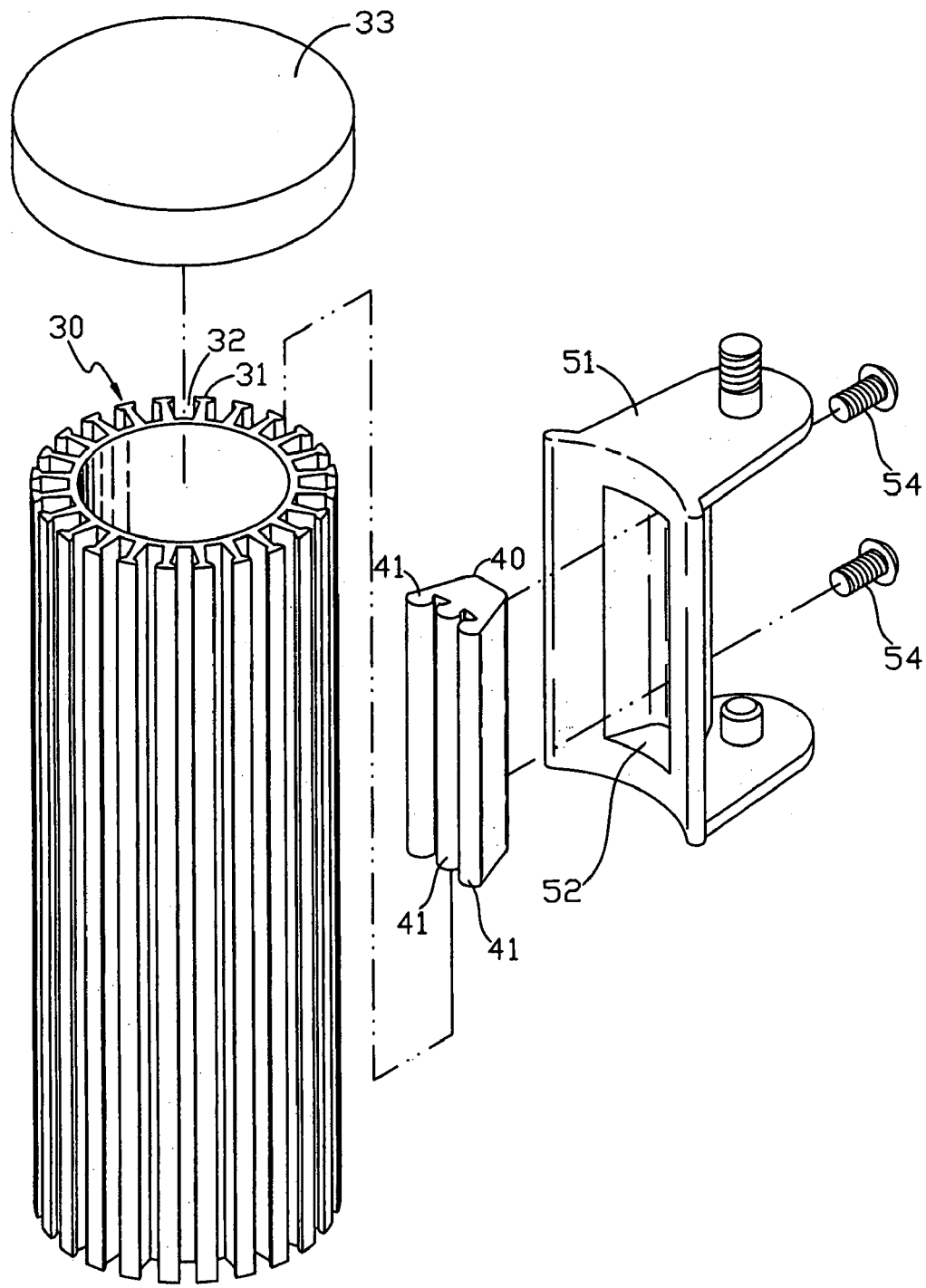
FIG. 2 is an exploded perspective view of the present invention.
Figure 3:
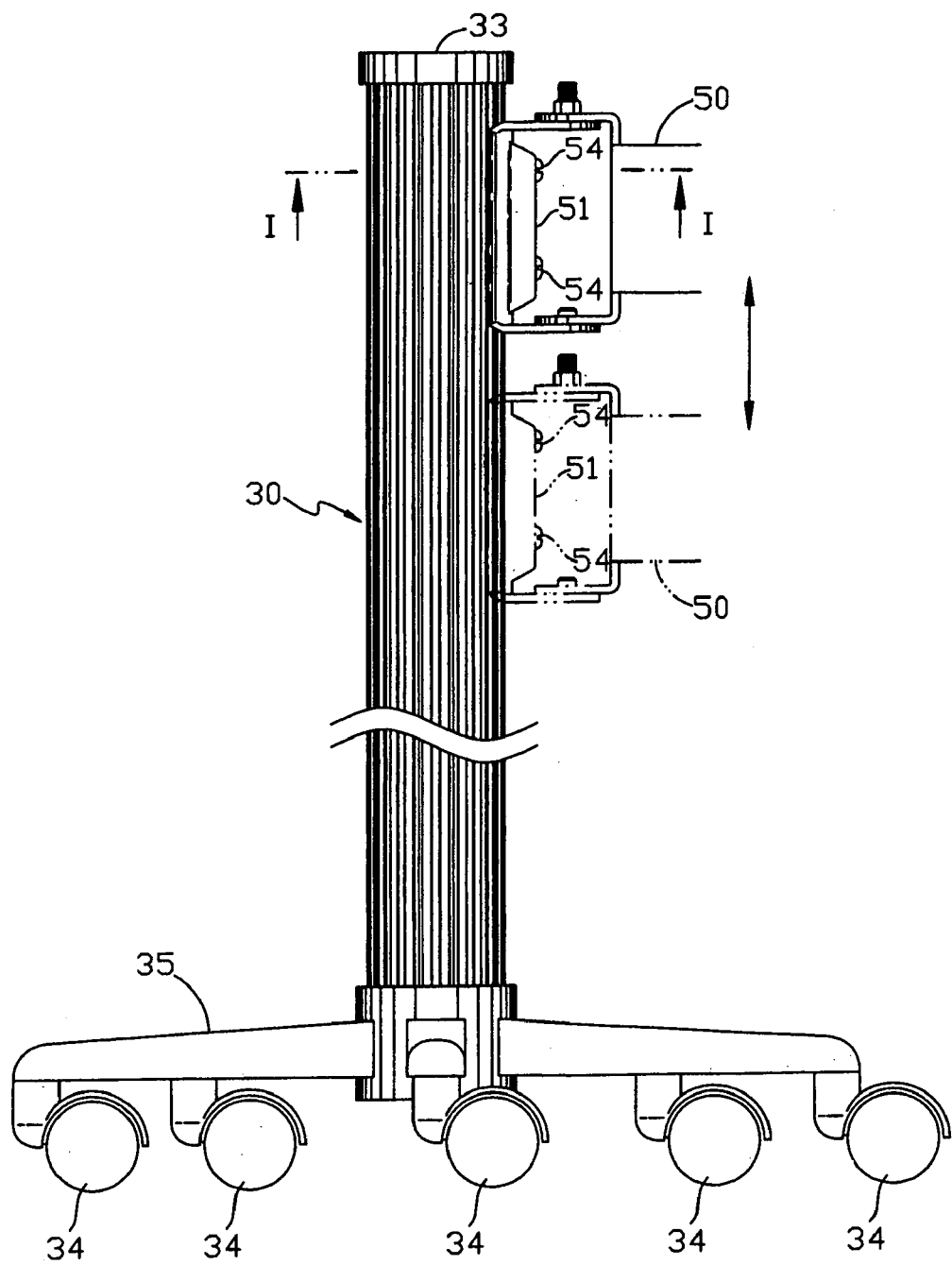
FIG. 3 is a lateral view of the present invention.
Figure 4:
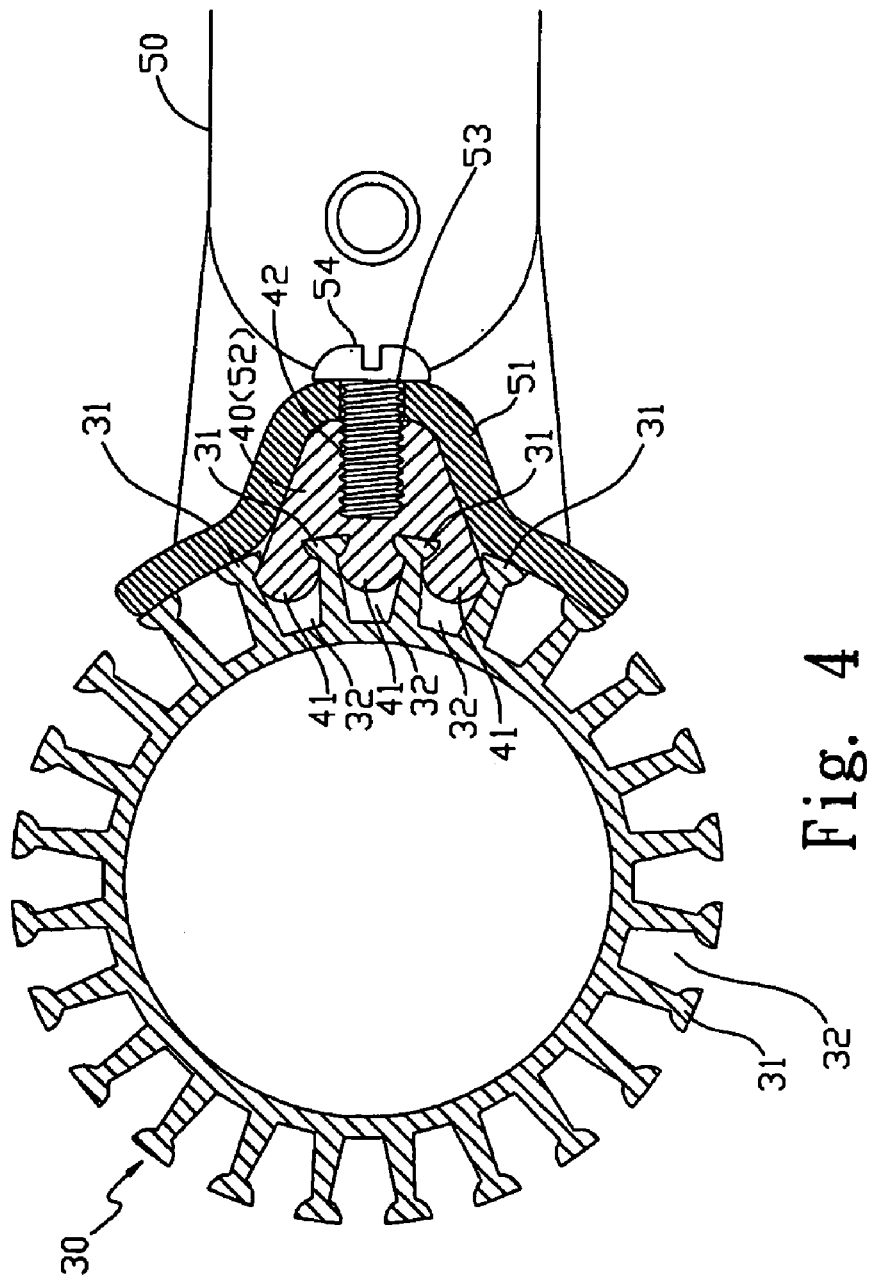
FIG. 4 is a cross section view along line I—I of FIG. 3.

With reference to FIGS. 2 to 4, the structure of the present invention is illustrated.

Referring to FIG. 2, the computer supporter of the present invention has the following elements.

A stand post 30 (see FIGS. 2, 3 and 4) is a hollow post. A surface of the stand post 30 has a plurality of T shape protrusions 31 which are axially arranged along the stand post 30. Each two T shape protrusions 31 are formed with a sliding recess 32. A top of the stand post 30 is installed with a cap 33. A bottom end of the stand post 30 is installed with a movable seat 35 having an omni-directional wheel 34.

A sliding block 40 (referring to FIGS. 2, 3, and 4) has a surface corresponding to the stand post 30 being installed with a plurality of sliding tracks 41. Each sliding track 41 has an $\Omega$ shape cross section. Each sliding track 41 passes through a respective one of the sliding recess 32 on the surface of the stand post 30. The sliding track 41 is slidable along the sliding recess 32. The T shape protrusion 31 serves to confine the sliding track 41 not to separate from the sliding recess 32. A plurality of screw holes 42 are formed on the sliding block 40.

A supporting frame 50 (referring to FIGS. 2, 3, and 4) has a configuration corresponding to an object placed thereon, such as a computer, a display, a keyboard, a printer, etc. A clamping seat 51 is formed at one end of the supporting frame 50. The clamping seat 51 is capable of being adhered to the surface of the stand post 30. The supporting frame 50 has a groove 52 for receiving the sliding block 40. The supporting frame 50 has holes 53 corresponding to the screw holes 42 of the sliding block 40. Studs 54 pass through the holes 53 and the screw holes 42 of the sliding block 40 so as to fix the supporting frame 50 to the sliding block 40.

By above mentioned structure, the sliding block 40 can be installed to different position of the stand post 30 based on the requirement of the supporting frame 50. The sliding block 40 is slidable along the sliding recess 32 to a required position. Then it is only necessary to screw the studs 54 so that the sliding block 40 and the supporting frame 50 are fixed to the stand post 30. In the present invention, the position of the stand post 30 can be adjusted conveniently.

Therefore, it is known that by the present invention, the computer supporter of the present invention is easily adjustable by adjusting the sliding block on the stand post so as to have a desired position for placing an object on the supporting frame. Thus, the user can have a comfortable position for operation.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A computer supporter comprising:

a stand post being a hollow post; a surface of the stand post having a plurality of T shape protrusions which are axially arranged along the stand post; each two T shape protrusions being formed with a sliding recess; a top of the stand post being installed with a cap; a bottom end of the stand post being installed with a movable seat having an omni-directional wheel;

a sliding block having a surface corresponding to the stand post; the sliding block being installed with a plurality of sliding tracks; each sliding track having an $\Omega$ shape cross section; each sliding track passing through a respective one of the sliding recess on the surface of the stand post; the sliding track being slidable along the sliding recess; the T shape protrusions serving to confine the sliding track not to separate from the sliding recess; a plurality of screw holes being formed on the sliding block;

a supporting frame; a clamping seat being formed at one end of the supporting frame; the clamping seat being capable of being adhered to the surface of the stand post; the supporting frame having a groove for receiving the sliding block; the supporting frame having holes corresponding to the screw holes of the sliding block; studs passing through the holes of the supporting frame and the screw holes of the sliding block so as to fix the supporting frame to the screw holes;

wherein by above mentioned structure, the sliding block is capable of being installed to different positions of the stand post.

* * * * *